United States Patent [19]

Nowlin

[11] Patent Number: 4,928,985

[45] Date of Patent: May 29, 1990

[54] BICYCLE BUGGY APPARATUS

[76] Inventor: Bobby R. Nowlin, 5753 Beth Rd., Huber Heights, Ohio 45424

[21] Appl. No.: 310,891

[22] Filed: Feb. 16, 1989

[51] Int. Cl.⁵ .................... B62K 27/00; B62K 27/12
[52] U.S. Cl. .................................. 280/204; 280/292; 280/656
[58] Field of Search ............... 280/204, 292, 656, 492, 280/400, 494, 63; 403/46; 411/514, 515

[56] References Cited

U.S. PATENT DOCUMENTS

| 430,673 | 2/1981 | Cox | 280/204 |
|---|---|---|---|
| 559,761 | 5/1896 | Armand | 280/204 |
| 609,857 | 8/1898 | West | 280/204 |
| 624,678 | 5/1899 | Planes | 280/204 |
| 933,420 | 9/1909 | Conradi et al. | 411/320 |
| 947,945 | 2/1910 | Sampson | 280/204 |
| 3,934,666 | 1/1976 | Ellington | 280/204 X |

FOREIGN PATENT DOCUMENTS

| 17301 | 6/1898 | France | 280/204 |
|---|---|---|---|
| 228791 | 2/1925 | United Kingdom | 280/204 |

Primary Examiner—Charles A. Marmor
Assistant Examiner—Alan M. Kagen
Attorney, Agent, or Firm—Leon Gilden

[57] ABSTRACT

A bicycle buggy apparatus is set forth including a conventional bicycle provided with a seat and downwardly extending seat stud received within the framework of the bicycle. A sleeve is pivotally mounted about the seat stud and includes a rearwardly extending connecting shaft removably secured to an "S" shaped coupling shaft at an upper end of the coupling shaft with a lower end of the "S" shaped coupling shaft secured to a buggy formed with a seat, spaced parallel sides, an underlying floor, and a mount rigidly secured to a forwardmost edge of the floor connected to the aforenoted coupling shaft.

5 Claims, 1 Drawing Sheet

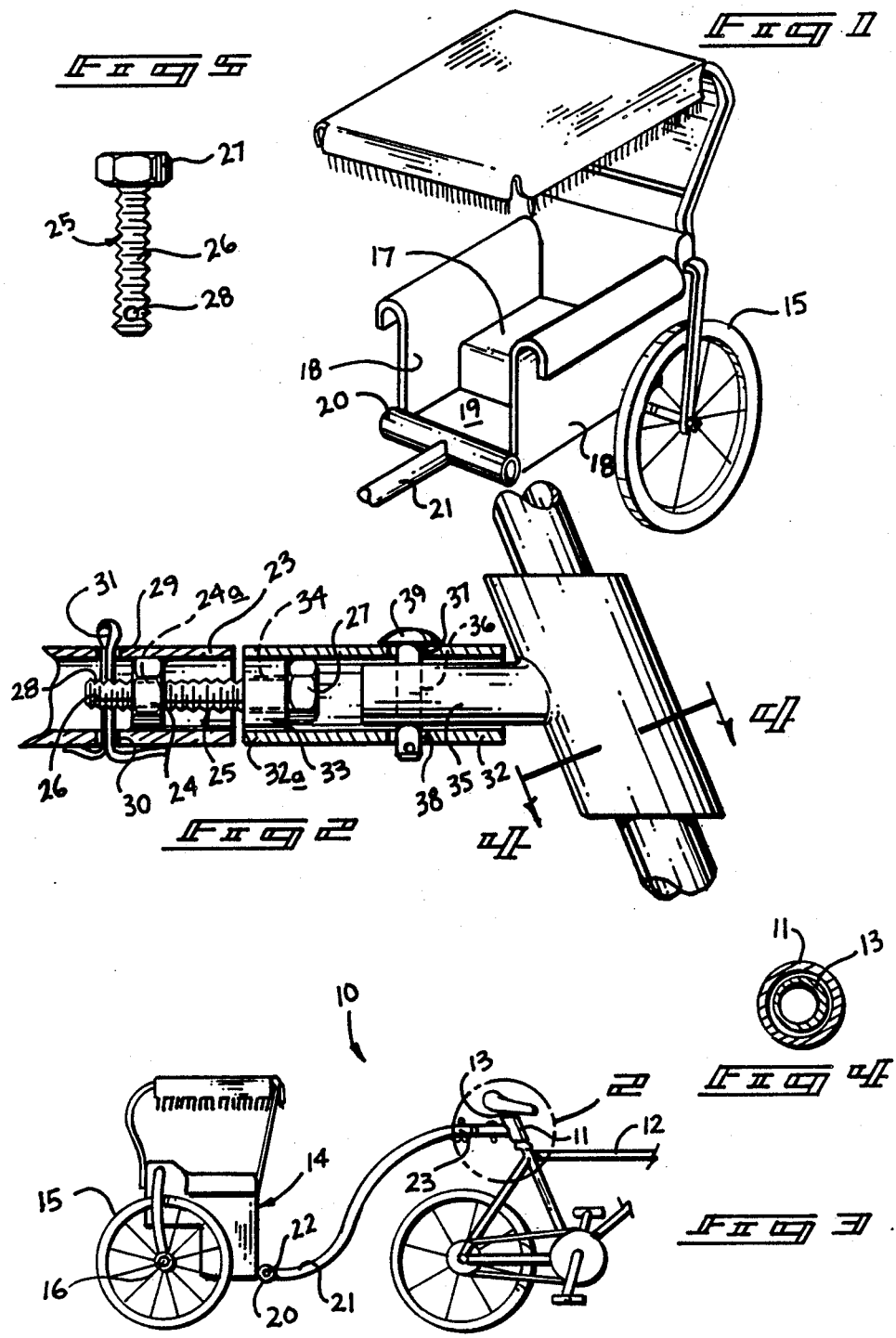

BICYCLE BUGGY APPARATUS

BACKGROUND OF THE INVENTION

1. Field of the Invention

The field of invention relates to buggy apparatus, and more particularly pertains to a new and improved bicycle buggy apparatus wherein the same is readily securable and detachable to an associated bicycle by means of an associated sleeve mounted to the bicycle.

2. Description of the Prior Art

The use of bicycles in cooperation with rearwardly mounted buggies is well known in the prior art. The apparatus of the prior art has generally been of elaborate or complex organizations to limit the utilization of such apparatus by individuals. The instant invention comprises a bicycle buggy apparatus wherein the same is readily securable and detachable to an associated bicycle wherein the same may be stored during periods of non-use and recoupled during need. For example, U.S. Pat. No 624,678 to Planes sets forth a buggy pivotally mounted at a lowermost forward edge of the buggy to a complex linkage arrangement secured to a rearward axle of the buggy, and to a coupling secured adjacent the seat of the apparatus. The Planes patent is of a relatively complex and elaborate organization limiting utilization. as opposed to that of the instant invention.

U.S. Pat. No. 947,945 to Sampson sets forth a further bicycle attachment apparatus wherein the buggy utilizes a forwardly extending loop securable to a rearwardly extending yoke attachable to the framework of the bicycle. The Sampson patent is again typical of the prior art setting forth elaborate structure wherein this instance provides for a continuously positioned obstruction adjacent the rear bicycle wheel, as opposed to &he coupling arrangement of the instant invention.

U.S. Pat. No. 559,761 to Armand sets forth a similarly extending yoke formed with a pivotal connection that in turn is securable to a forwardly mounted yoke of the buggy apparatus. The Armand patent again utilizes rearwardly extending projection adjacent the rear tire in securement of an associated buggy to a bicycle.

U.S. Pat. No. 609,857 to West sets forth a bicycle attachment apparatus wherein a plurality of forwardly extending links are securable to a framework of a bicycle wherein the West patent in securement to an associated bicycle includes involvement of a labor intensive organization with parallel links securing the buggy to the bicycle, as opposed to a single link mounting arrangement utilized by the instant invention.

U.S. Pat. No. 4,306,733 to Cox utilizes a rearwardly extending "V" shaped yoke securable to a rearwardly mounted buggy utilizing a complex link arrangement of enhanced complexity, as opposed to that of the instant invention.

As such, it may be appreciated that there continues to be a need for a new and improved bicycle buggy apparatus wherein the same addresses both the problems of selective usage when desired and ease of installation, and in this respect, the present invention substantially fulfills this need.

SUMMARY OF THE INVENTION

In view of the foregoing disadvantages inherent in the known types of bicycle buggy apparatus now present in the prior art, the present invention provides a bicycle buggy apparatus wherein the same may be readily stored when not in use and more further be easily and efficiently secured to an associated bicycle during periods of use. As such, the general purpose of the present invention, which will be described subsequently in greater detail, is &o provide a new and improved bicycle buggy apparatus which has all the advantages of the prior art bicycle buggy apparatus and none of the disadvantages.

To attain this, the present invention comprises a bicycle buggy apparatus utilizing an "S" shaped coupling shaft securing a lower forwardmost edge of an associated buggy to a connecting shaft to readily enable securement and disengagement of an associated bicycle to the buggy with a plurality of locking pins to secure the connecting shaft to a sleeve pivotally mounted to the bicycle and further including an elongate threaded bolt selectivelY maintained within the coupling shaft and the connecting shaft.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved bicycle buggy apparatus which has all the advantages of the prior art bicycle buggy apparatus and none of the disadvantages.

It is another object of the present invention to provide a new and improved bicycle buggy apparatus which may be easily and efficiently manufactured and marketed.

It is a further object of the present invention to provide a new and improved bicycle buggy apparatus which is of a durable and reliable construction.

An even further object of the present invention is to provide a new and improved bicycle buggy apparatus which is susceptible of a low cost of manufacture with regard to both materials and labor, and which accordingly is then susceptible of low prices of sale to the consuming public, thereby making such bicycle buggy apparatus economically available to the buying public.

Still yet another object of the present invention is to provide a new and improved bicycle buggy apparatus which provides in the apparatuses and methods of the prior art some of the advantages thereof, while simultaneously overcoming some of the disadvantages normally associated therewith.

Still another object of the present invention is to provide a new and improved bicycle buggy apparatus wherein the same is pivotally mounted to an associated bicycle and may be readily secured and removed from the bicycle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of the buggy utilized by the instant invention.

FIG. 2 is an enlarged cross-sectional view of the coupling association as utilized by the instant invention.

FIG. 3 is an orthographic view taken in elevation of the bicycle buggy apparatus in association with an existing bicycle.

FIG. 4 is an orthographic view taken along the lines 4—4 of FIG. 2 in the direction indicated by the arrows.

FIG. 5 is an orthographic view taken in elevation of the bolt utilized by the instant invention.

DESCRIPTION OF THE PREFERRED EMBODIMENT

With reference now to the drawings, and in particular to FIGS. 1 to 5 thereof, a new and improved bicycle buggy apparatus embodying the principles and concepts of the present invention and generally designated by the reference numeral 10 will be described.

More specifically, it will noted that the bicycle buggy apparatus 10 essentially comprises a sleeve 11 pivotally mounted about a seat stud 13 integrally secured to and downwardly depending from an associated bicycle seat of the bicycle 12 wherein the seat stud 13 is received fixedly within the framework of the bicycle. The sleeve 11 remains mounted about the seat stud 13 for subsequent coupling and disengagement of the associated buggy of the instant invention. Further, the sleeve 11 enables pivotment of the buggy relative to the seat to enhance maneuvering and ease of use of the apparatus.

The buggy 14 of the instant invention is mounted upon an axle 16 rotatably mounting spaced wheels 15. The buggy 14 includes a seat 17 fixedly positioned between side walls 18 of an "L" shaped floor 19 overlying the axle 16 medially to enhance weight distribution of individuals positioned within the buggy 14. A forwardmost edge of the floor 19 has integrally secured thereto a mount 20 with an "S" shaped coupling shaft 21 extending orthogonally outwardly of the mount 20 at a lower end 22 of the coupling shaft 21. An upper end 23 of the coupling shaft 21 is of cylindrical hollow construction to fixedly receive therewithin a securement member 24 formed with a threaded aperture 24a extending therethrough for receiving a bolt 25. The bolt 25 is formed with an elongate threaded shank 26 with an orthogonally and integrally secured head 27 in a large dimension relative to the diameter of the shank 26. The shank 26 includes a shank aperture 28 extending orthogonally and diametrically proximate a lowermost end of the shank 26.

The upper end 23 of the coupling shaft 21 includes a plurality of diametrically opposed apertures including an upper coupling shaft aperture 29 and an underlying lower coupling shaft aperture 30 for receiving the locking pin 31 to extend through the upper and lower coupling shafts 29 and 30 respectively and capturing the bolt 25 by means of the shank aperture 28 when the shank 26 extends outwardly of the securement member 24. It is understood that the shank aperture 28 is to be vertically aligned with the upper and lower coupling shaft apertures 29 and 30 to enable positioning of the locking pin 31 therethrough.

A separate cylindrical and elongate hollow connecting shaft 32 axially aligned with the upper end 23 of the coupling shaft 21 has fixedly secured at a rearwardmost end 32a of the connecting shaft 32 a positioning sleeve 33 formed with a smooth through-extending sleeve aperture 34 of a diameter substantially equal to the diameter of the threaded shank 26. Accordingly, the threaded shank 26 is positioned slidingly through the sleeve aperture 34 to extend rearwardly and axially to the interior of the upper end 23 of the coupling shaft 21. The forwardmost end of the connecting shaft 32 receives a stub shaft 35 interiorly thereof wherein the stub shaft 35 is integrally secured to the rotatable sleeve 11 at a non-orthogonal angle relative thereto. The stub shaft 35 is formed with a diametrically and orthogonally extending stub shaft aperture 36 to be aligned with an upper and lower connecting shaft aperture 37 and 38 respectively whereupon positioning and alignment of the stub shaft aperture 36 with the connecting shaft apertures, a second lock pin 39 secures the stub shaft 35 to the position sleeve 33 and accordingly the coupling shaft 21. It may be appreciated therefore that to remove the buggy and coupling arrangement, an individual merely removes the second lock pin 39 leaving the rotatable sleeve 11 and the associated stub shaft 35 remaining on the seat stud 13 of the bicycle to effect ready removal and replacement of the buggy relative to the bicycle.

As to the manner of usage and operation of the instant invention, the same should be apparent from the above description and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation

What is claimed is being new and desired to be protected by LETTERS PATENT of the United States is as follows:

1. A bicycle buggy apparatus in combination with a bicycle, said bicycle including a framework and a bicycle seat with a seat stud extending downwardly of the bicycle seat and receivable within the framework, and the bicycle buggy apparatus comprising, a buggy including a seat overlying a floor with a plurality of wheels positioned under said floor proximate a rear end of said floor, and an elongate mount extending along and integrally secured to a forward edge of said floor, and a coupling shaft fixedly secured to said mount, and a sleeve member mounted to said seat stud, and connecting means joining said sleeve member to said coupling shaft for selectively joining said coupling shaft to said sleeve member, and wherein said coupling shaft is of a generally "S" shaped configuration extending orthogonally outwardly of said mount and fixedly secured to said mount at a lower end and terminating at its other end in elevation above the lower end at and upper end, and said upper end including joining means securing said upper end to said connecting means, and wherein said joining means includes a securement member fixedly secured interiorly of said upper end and spaced from said upper end, and said securement member including a threaded aperture axially aligned with said upper end, and a threaded member receivable within the threaded aperture of the securement member, and wherein the threaded member includes an elongate threaded shank receivably threaded through the threaded aperture and an enlarged head of a diameter greater than that of the threaded shank, and the threaded shank formed with a shank aperture formed orthogonally through the threaded shank proximate a distal end thereof, and wherein the upper end of the coupling shaft includes an upper and lower coupling shaft aperture diametrically opposed and alignable with said shank aperture, and a first locking pin extending through said upper and lower coupling shaft apertures and simultaneously through said shank aperture to secure said threaded shank relative to said upper end.

2. A bicycle buggy apparatus as set forth in claim 1 wherein said connecting means includes a positioning sleeve integrally secured at a rear distal end of said connecting means adjacent said upper end of the coupling shaft wherein the positioning sleeve is formed with a through extending aperture therethrough for slidingly receiving the threaded shank; said aperture is of a diameter substantially equal to that of the threaded shank whereby the head secured to the threaded shank is in abutment overlying the smooth aperture of the positioning sleeve.

3. A bicycle buggy apparatus as set forth in claim 2 wherein the connecting means slidably receives a solid cylindrical stub shaft integrally secured to the sleeve member at an oblique angle thereto.

4. A bicycle buggy apparatus as set for&h in claim 3 wherein the stub shaft is formed with a through-extending stub aperture orthogonally relative to an axis defined by the stub shaft, and wherein the connecting means is formed with an upper and lower connecting aperture alignable with the stub aperture, and further including a second lock pin positionable through the upper and lower connecting apertures and the stub aperture to secure the stub shaft to the connecting means.

5. A bicycle buggy apparatus as set forth in claim 4 wherein the sleeve member is rotatably mounted to the seat stud and wherein the sleeve member defines a cylindrical opening therethrough substantially equal to that of a seat stud diameter defined by the seat stud.

* * * * *